United States Patent
Bell

(10) Patent No.: US 9,391,459 B2
(45) Date of Patent: Jul. 12, 2016

(54) MESH DELIVERY SYSTEM

(71) Applicant: Utilidata, Inc., Providence, RI (US)

(72) Inventor: David Gordon Bell, Spokane, WA (US)

(73) Assignee: UTILIDATA, INC., Providence, RI (US)

( * ) Notice: Subject to any disclaimer, the term of this patent is extended or adjusted under 35 U.S.C. 154(b) by 3 days.

(21) Appl. No.: 14/212,561

(22) Filed: Mar. 14, 2014

(65) Prior Publication Data

US 2014/0200728 A1   Jul. 17, 2014

Related U.S. Application Data

(63) Continuation of application No. 13/369,794, filed on Feb. 9, 2012, now Pat. No. 8,676,396.

(60) Provisional application No. 61/441,224, filed on Feb. 9, 2011.

(51) Int. Cl.
| | |
|---|---|
| *G01R 19/00* | (2006.01) |
| *H02J 4/00* | (2006.01) |
| *G01D 4/00* | (2006.01) |
| *G06F 17/14* | (2006.01) |

(52) U.S. Cl.
CPC . *H02J 4/00* (2013.01); *G01D 4/002* (2013.01); *G06F 17/14* (2013.01); *Y02B 70/3266* (2013.01); *Y02B 90/241* (2013.01); *Y04S 20/242* (2013.01); *Y04S 20/32* (2013.01)

(58) Field of Classification Search
None
See application file for complete search history.

(56) References Cited

U.S. PATENT DOCUMENTS

| | | | |
|---|---|---|---|
| 8,437,883 B2 | 5/2013 | Powell et al. | |
| 8,577,510 B2 | 11/2013 | Powell et al. | |
| 8,676,396 B2 * | 3/2014 | Bell | 700/297 |
| 8,903,670 B2 * | 12/2014 | Guruprasad | 702/79 |
| 9,163,963 B2 * | 10/2015 | Bell | G01D 18/002 |
| 2004/0125740 A1 | 7/2004 | Gardner | |
| 2004/0139135 A1 | 7/2004 | Druck | |
| 2006/0195229 A1 | 8/2006 | Bell et al. | |
| 2007/0013547 A1 | 1/2007 | Boaz | |

(Continued)

OTHER PUBLICATIONS

Eng, et al., "Algorithms for Downsampling Non-Uniformly Sampled Data", 15th European Signal Processing Conference (EUSIPCO 2007), Poznan, Poland, Sep. 3-7, 2007, copyright by EURASIP, (5 pages).

(Continued)

*Primary Examiner* — Ryan Jarrett
(74) *Attorney, Agent, or Firm* — Foley & Lardner LLP; Christopher J. McKenna; Chethan K. Srinivasa

(57) ABSTRACT

A mesh delivery system for controlling electricity supplied to one or more electrical devices from a power source are disclosed. Signals relating to characteristics of the electrical devices are uniformly or non-uniformly sampled at discrete intervals are provided along with associated sampling time indications via the mesh network to a destination controller. The controller applies a compacting algorithm to the received samples and the received associated time indications to generate a paired vector comprising samples and an associated compacted time indication. The paired vector representing the sampled signal in a time domain is transformed into a discrete Fourier spectrum of the signal in the frequency domain where the discrete Fourier spectrum of the signal is in a uniformly sampled in the frequency domain. A filter is applied in the frequency domain to the discrete Fourier spectrum of the signal to generate a filtered discrete spectral representation, and an inverse discrete Fourier transform of the filtered discrete spectral representation is applied to generate a recovered signal in the time domain that is uniformly sampled.

20 Claims, 5 Drawing Sheets

(56) References Cited

U.S. PATENT DOCUMENTS

| | | |
|---|---|---|
| 2007/0096747 A1 | 5/2007 | Wells |
| 2007/0113048 A1 | 5/2007 | Royer et al. |
| 2008/0069034 A1 | 3/2008 | Buddhikot et al. |
| 2008/0071482 A1 | 3/2008 | Zweigle et al. |
| 2009/0276173 A1 | 11/2009 | Wang et al. |
| 2010/0090674 A1 | 4/2010 | Bell |
| 2010/0202436 A1 | 8/2010 | Albert et al. |
| 2010/0281090 A1 | 11/2010 | Chan et al. |
| 2011/0066297 A1 | 3/2011 | Saberi et al. |
| 2011/0195657 A1 | 8/2011 | Takeda et al. |
| 2012/0084036 A1 | 4/2012 | Booman et al. |
| 2014/0265574 A1 | 9/2014 | Tyler et al. |
| 2014/0277796 A1 | 9/2014 | Peskin et al. |
| 2014/0277813 A1 | 9/2014 | Powell et al. |
| 2014/0277814 A1 | 9/2014 | Hall et al. |
| 2014/0312693 A2 | 10/2014 | Powell et al. |

OTHER PUBLICATIONS

US Office Action for U.S. Appl. No. 14/042,126 dated Sep. 3, 2014.
US Office Action for U.S. Appl. No. 14/042,110 dated Nov. 4, 2014.
International Preliminary Report on Patentability issued Aug. 22, 2013 in PCT Application No. PCT/US2012/024519.
International Search Report and Written Opinion issued Jul. 23, 2013 in PCT Application No. PCT/US2013/031687 (12 pages).
International Search Report and Written Opinion issued Sep. 27, 2012 in PCT Application No. PCT/US2012/024519.
US Notice of Allowance in U.S. Appl. No. 13/369,794 dated Jan. 7, 2014.
US Office Action in U.S. Appl. No. 13/369,794 dated Sep. 9, 2013.
US Office Action in U.S. Appl. No. 14/042,126 dated Mar. 18, 2014.
Eng, F., Gunnarsson, F., and Gustafsson, F., "Frequency Domain Analysis of Signals with Stochastic Sampling Times", IEEE Trans SP vol. 56, No. 7, pp. 3089-3099.
US Notice of Allowance to U.S. Appl. No. 14/042,110 Dated Jun. 4, 2015.
US Office Action for U.S. Appl. No. 14/042,110 dated Feb. 26, 2015.
US Office Action for U.S. Appl. No. 14/042,126 dated Mar. 17, 2015.
US Notice of Allowance to U.S. Appl. No. 14/042,126 dated Jul. 7, 2015.

* cited by examiner

Destination Controller

MESH DELIVERY SYSTEM

CROSS-REFERENCE TO RELATED APPLICATIONS

This application claims the benefit of priority under 35 U.S.C. §120 as a continuation of U.S. patent application Ser. No. 13/369,794, filed Feb. 9, 2012, which claims the benefit of priority under 35 U.S.C. §119 to U.S. Provisional Patent Application No. 61/441,224, filed Feb. 9, 2011, each of which are incorporated by reference herein in their entirety.

The technology described in this application can be used in conjunction with any of the technology described in U.S. patent application Ser. No. 11/397,091, filed Apr. 4, 2006; U.S. patent application Ser. No. 12/540,364 filed Apr. 13, 2009; U.S. patent application Ser. No. 12/540,366 filed Apr. 13, 2009; U.S. Pat. No. 7,069,117 filed Jun. 27, 2006; and U.S. Pat. No. 7,729,810 filed Jun. 1, 2010 which are hereby incorporated by reference.

TECHNICAL FIELD

These claimed embodiments relate to delivering information via a mesh telemetry system and more particularly to delivering data using a delivery system having variable transport delay or where data messages can be lost and/or unrecovered or both.

BACKGROUND OF THE INVENTION

A method and apparatus for delivering information using a mesh telemetry system is disclosed.

When delivering signals using mesh telemetry systems, some samples of the source signal may be delayed or lost. Further the delay at which the signal samples arrive from the source is unpredictable thereby degrading the signal for purposes requiring uniformly sampled time series signals. Because certain signal samples may be lost, the lost information contained in the source signal may not be fully reconstructed.

SUMMARY OF THE INVENTION

A process is described in which a controller receives at a destination node signal samples and associated sampling time indications. The sampling method may be chosen based on the characteristics of the subject signal or based on the requirements of the user of the recovered signal, and may for example include zero-order-hold sampling, first-order-hold sampling, or integrating sampling. The signal recovery method disclosed herein is not limited by any choice of sampling method. The "associated sampling time indications" may be derived from an actual sample interval (e.g. a time difference between that of the present and previous samples) for each observation (sample) of the non-uniformly sampled signal to be recorded. The signal samples and the associated sampling time indications are received by a controller from a source node via a mesh network. The signal samples may be delivered with associated sampling time indications at the source node to form sampled time series of one or more signals corresponding to a characteristic related to electricity supplied to one or more electrical devices from a power source. In another implementation, the associated sampling time indications may be derived from a sampling clock in the controller. The controller applies a compacting algorithm to the received samples and the received or derived associated sampling time indications to generate a paired vector that includes the compacted signal samples and an associated compacted time indication. The paired vector, representing the compacted non-uniformly sampled signal, is transformed from a sampled time domain into a discrete Fourier spectrum of the signal in a frequency domain (aka discrete spectral representation) where the discrete Fourier spectrum of the signal is uniformly sampled in the frequency domain (that is, the spectrum is known at discrete uniformly spaced frequencies). A low-pass filter is applied in the frequency domain to the discrete Fourier spectrum of the signal to generate a filtered discrete spectral representation. An inverse discrete Fourier transform of the filtered discrete spectral representation is applied to generate a recovered signal in the time domain that is uniformly sampled.

In another implementation the method further includes, but is not limited to, providing an adjustment signal to adjust one or more of the characteristics of the electricity supplied from the power source based on the recovered signal.

In an additional implementation, applying a filter in the frequency domain to the discrete Fourier spectrum of the signal to generate a filtered discrete spectral representation includes, but is not limited to, applying a bandpass pass filter in the frequency domain to the discrete Fourier spectrum of the signal. In a further implementation, applying a filter in the frequency domain to the discrete Fourier spectrum of the signal to generate a filtered discrete spectral representation includes, but is not limited to, applying a low pass filter in the frequency domain to the discrete Fourier spectrum of the signal.

In another implementation, applying an inverse discrete Fourier transform of the filtered discrete spectral representation to generate a recovered signal in the time domain that is uniformly sampled includes, but is not limited to, applying an inverse discrete Fourier transform to the filtered discrete spectral representation to generate the recovered signal in the time domain that is uniformly sampled.

In another implementation, applying with the controller a compacting algorithm to the received samples and the received or derived associated sampling time indications to generate a paired vector comprising samples and an associated compacted time indication further includes, but is not limited to, determining void indications in the received signal samples, and indicating a sampling time for each of the determined void indications.

In a further implementation, a characteristic related to electricity supplied to one or more electrical devices from a power source includes, but is not limited to, voltage, current, real power, power flow direction, reactive power, temperature or humidity.

In another implementation, the mesh network includes a plurality of emitters, wherein a first emitter of the plurality of emitters is operable to connect to a second one of the plurality of emitters to form a path to deliver signals between the source node and the destination node, and wherein the at least the first emitter is operable to automatically connect to a third emitter of the plurality of emitters to form a new path between the source node and the destination node when interference is present between the first emitter and the second emitter.

In a further implementation, the attenuation characteristics of the low pass frequency filter are set related to the rate at which the one or more of the characteristics of the electricity supplied from the power source can be adjusted.

In another implementation, applying an inverse discrete Fourier transform of the filtered discrete spectral representation to generate a recovered signal in the time domain that is uniformly sampled includes, but is not limited to extrapolating future values of the recovered signal in the time domain by setting the time basis in the inverse discrete Fourier transform to be greater than the total age of the compacted source signal, and wherein the adjustment signal is provided based on the extrapolated future values to compensate for a group delay of the filter.

In an additional implementation, the signal samples are non-uniformly delivered to the destination node from the source node via the mesh network.

In another implementation, delivering the signal samples being delivered with time indications includes, but is not limited to, delivering the signal samples with an associated sampling time indication or with a delivery time indications.

In a further implementation, the associated compacted time indication indicates a time of arrival of the samples at the destination node or an actual time of the sample of the characteristic.

In another implementation, a system is disclosed including a source controller comprising a device to detect measurements corresponding to a characteristic of electricity supplied to one or more electrical devices from a power source. A sampler uniformly samples at intervals the detected measurements and a transmitter transmits via a mesh network the sampled detected measurements and associated time indications of the detected measurements. A destination controller is provided that includes a receiver to receive from the source controller via the mesh network signal samples and associated sampling time indications. The sampled signals may or may not be uniformly sampled if the mesh telemetry system fails to correctly transmit and receive any given such sample. The signal samples are delivered with associated sampling time indications at the source node to form a sampled signal corresponding to a characteristic related to electricity supplied to one or more electrical devices from a power source. In another implementation, the associated sampling time indications may be derived from a sampling clock in the controller. The controller includes a device to apply a compacting algorithm to the received samples and the received or derived associated time indications to generate a paired vector comprising a compacted sample record and an associated compacted sampling time indication. The destination controller also implements a transform process to transform the paired vector representing the sampled signal in a time domain into a discrete Fourier spectrum of the signal in the frequency domain where the discrete Fourier spectrum of the signal is uniformly sampled in the frequency domain. A low pass or band-pass filter in the frequency domain is applied to filter the discrete Fourier spectrum of the signal to generate a filtered discrete spectral representation, and an inverse discrete Fourier transform device is included to transform the filtered discrete spectral representation into a recovered signal in the time domain that is uniformly sampled. The characteristics of the low pass and band-pass filters may be set depending on the intended use for the recovered signal. In an additional implementation, the destination controller comprises a second transmitter to provide an adjustment signal to adjust one or more of the characteristics of the electricity supplied from the power source based on the recovered signal.

In addition, a computer readable storage medium comprising instructions is disclosed. The instructions when executed by a processor receives with a controller at a destination node signal samples and associated sampling time indications, the signal samples and the associated sampling time indications being received from a source node via a mesh network. The signal samples are delivered with associated sampling time indications at the source node to form a sampled signal corresponding to a characteristic related to electricity supplied to one or more electrical devices from a power source. The instructions apply with the controller a compacting algorithm to the received samples and the received or derived associated time indications to generate a paired vector comprising compacted samples and an associated compacted sampling time indication, and transform the paired vector representing the sampled signal in a time domain into a discrete Fourier spectrum of the signal in the frequency domain where the discrete Fourier spectrum of the signal is in a uniformly sampled in the frequency domain. The instructions also apply a filter in the frequency domain to the discrete Fourier spectrum of the signal to generate a filtered discrete spectral representation, and apply an inverse discrete Fourier transform of the filtered discrete spectral representation to generate a recovered signal in the time domain that is uniformly sampled.

Various embodiments may include any of the above described features, either alone or in any suitable combination.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different figures indicates similar or identical items.

DETAILED DESCRIPTION

Figure 1:
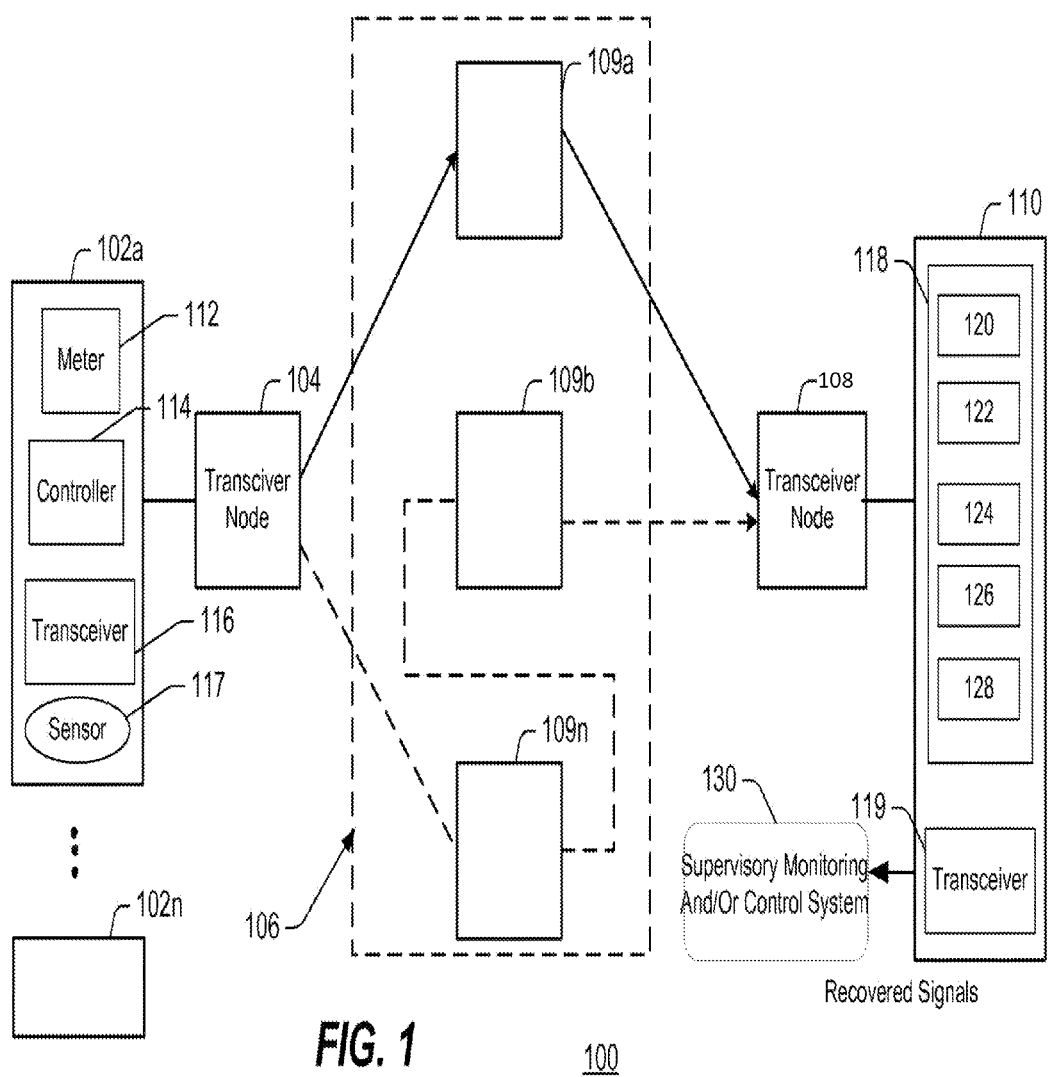
FIG. 1 is a simplified schematic diagram of a system for delivering information via a wireless mesh network.

Referring to FIG. 1, there is shown a wireless mesh deliver system 100 including a source controllers 102a-102n connected via mesh network 106, including but not limited to a wireless mesh network, to destination controller 110. Exemplary Source controller 102a may include a meter device 112, a sampler/controller device 114, a transmitter 116 and a sensor 117. Sensor 117 senses characteristics of electrical power as delivered by a power source (not shown). Destination controller 110 includes a controller device 118 and a transceiver 119. Controller device 118 has a receiver 120, a compacting device 122, a domain transform device 124, a filter device 126 and an inverse transform device 128. Destination controller 110 may be coupled to a supervisory monitoring and/or control system 130.

Mesh network 106 includes a transceiver node 104, transceiver node 108, and additional transceiver nodes 109a-109n (also referred to herein as emitters). Transceiver nodes (such as nodes 104 or 108) receive signals from other nodes either via a wireless or wireline connection, and feed the received signals to a controller. Transceiver nodes (such as nodes 104 or 108) may transmit signals from other nodes either via a wireless or wireline connection in response to signals received from the controller.

In one implementation, mesh network 106 includes many emitters and a node 108 coupled with the destination controller 110. A first emitter, such as node 104, of the emitters can connect to a second emitter 109a of the emitters to form a path to deliver signals between the source node 102a and the destination node 110. The first emitter, such as node 104, may automatically connect to a third emitter, such as node 109n, and a fourth emitter such as emitter 109b, of the emitters to form a new path between the source node 102 and the destination node 110 when interference is present between the first emitter, e.g. node 104 and the second emitter, e.g. emitter 109a.

In one implementation, second transmitter 119 of destination controller 110 includes provides an adjustment signal to adjust one or more of the characteristics of the electricity supplied from the power source based on the recovered signal.

Meter device 112 may detect measurements corresponding to a characteristic of electricity supplied to one or more electrical devices from a power source (not shown). Sampler device 114 uniformly samples at intervals the detected measurements. Transmitter 116 transmits via mesh network 106 the sampled detected measurements and associated time indications of the detected measurements.

The receiver 120 in the destination controller 110 receives signal samples and associated sampling time indications from the source controller 102 via the mesh network 116. In one implementation, the signal samples are delivered with the associated sampling time indications to form a sampled signal corresponding to a characteristic related to electricity supplied to one or more electrical devices from the power source. The signal samples may be delivered with an associated sampling time indication or with a delivery time indications. In another implementation, the signal samples are non-uniformly delivered to the destination node 110 from the source node 102 via the mesh network.

Compacting device 122 applies a compacting algorithm to the received samples and the received or derived associated time indications to generate a paired vector that includes samples and an associated compacted sampling time indication. The associated compacted sampling time indication may indicate a time of arrival of the samples at the destination node 110 or a derived time of the sample of the characteristic (at the source nodes 102a-102n). An exemplary compacting algorithm will be described further herein in connection with FIG. 5.

Domain Transformer 124 (or Domain transform device 124) transforms the paired vector representing the compacted sampled signal in a time domain into a discrete Fourier spectrum of the signal in the frequency domain using an Approximate Fourier Transform such that the discrete Fourier spectrum of the signal is uniformly sampled in the frequency domain. In one implementation, the subject signal as received by the controller (via the telemetry system) is assumed to be non-uniformly sampled in the time domain. Further the transform process is a generalized version of the discrete Fourier transform in which each valid sample of the time domain signal is weighted by the sample time between it and the previous such valid sample, the sample time being derived from the associated sampling time indications by the sample compacting algorithm.

Filter device 126 filters in the frequency domain the discrete Fourier spectrum of the signal to generate a filtered discrete spectral representation. Inverse transformer or Inverse transform device performs an inverse discrete Fourier transform to transform the filtered discrete spectral representation into a recovered signal in the time domain that is uniformly sampled. Destination node 110 may transmit the recovered signal to a supervisor monitoring and/or control system 130. In one implementation, filter device 126 may be a low pass filter. Further the attenuation characteristics of the low pass filter are set as a function of the rate at which the one or more of the characteristics of the electricity supplied from the power source can be adjusted. In another implementation, filter device 126 may be a band pass filter. Further the attenuation characteristics of the band pass filter are determined by variations in characteristics of the recovered signal. These attenuation characteristics may be used in making adjustments to the power source. In one implementation, the controller 110 may require estimates of certain variational characteristics in the recovered signal in order to make the adjustments to the power source. Such estimation is facilitated by first applying a bandpass filter to the signal in the recovery process.

Example Controller Architecture

Figure 2:
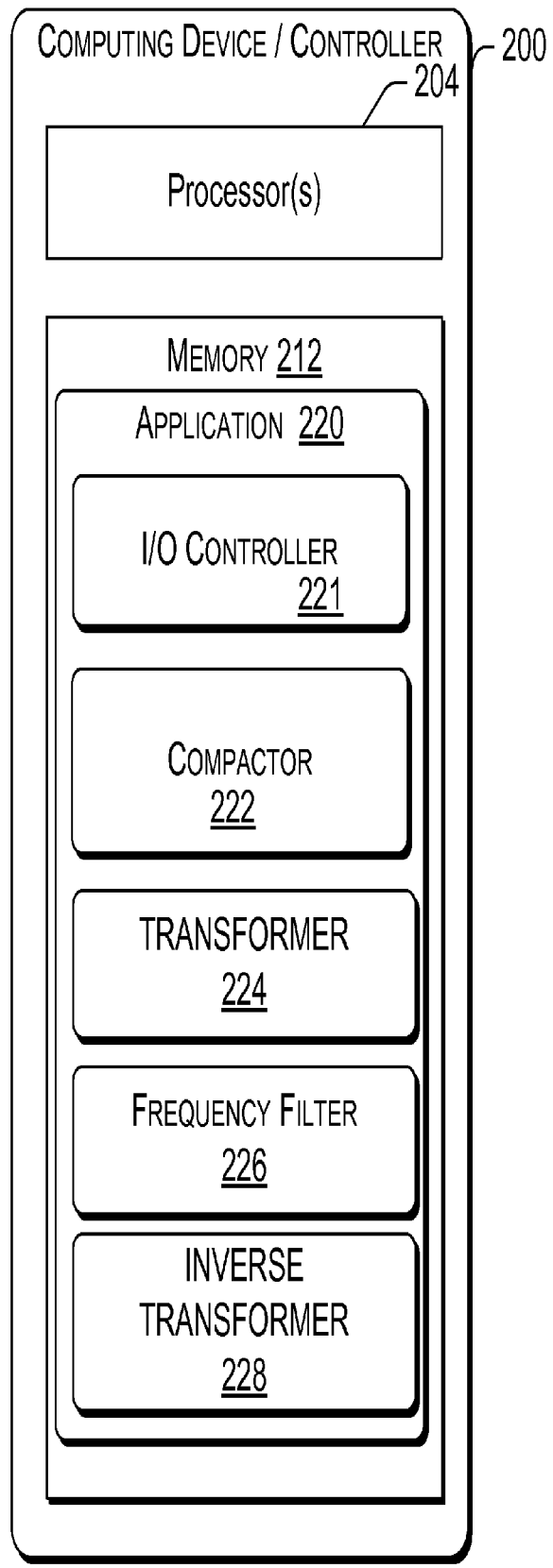
FIG. 2 is a simplified schematic diagram of a processing element that processes information delivered via a wireless mesh network.

In FIG. 2 are illustrated selected modules in Controller 200. Controller 200 may operate as a destination controller 110, may use process 300 shown in FIG. 3. In another implementation, controller 200 may operate as a source controller 102 using process 400 shown in FIG. 4. Controller 200 receives and/or transmits signals from/to a transceiver node (such as transceiver node 104 or 108). Controller 200 has processing capabilities and memory suitable to store and execute computer-executable instructions. In one example, Controller 200 includes one or more processors 204 and memory 212. In one implementation, controller 200 may be coupled with the destination node to receive signal samples and associated sampling time indications from the destination node.

The memory 212 may include volatile and nonvolatile memory, removable and non-removable media implemented in any method or technology for storage of information, such as computer-readable instructions, data structures, program modules or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computer system.

Stored in memory 212 of the Controller 200 may include an application 220 that includes modules containing instructions for execution by processor 204. Exemplary modules include an I/O controller module 221, a compactor module 222, a transform module 224, a frequency filter module 226 and an inverse transform module 228. I/O controller module 221 may contain drivers to enable controller 200 to communicate with a transceiver node (such as node 104 or node 108).

Application 220 in controller 200 receives signal samples and associated sampling time indications from the destination node 110. The signal samples are delivered with sampling time indications to form a sampled signal corresponding to one or more characteristic(s) related to electricity supplied to one or more electrical devices from the power source.

Compactor module 222 includes instructions that enable the controller to apply a compacting algorithm to the received samples and the received or derived associated sampling time indications to generate a paired vector that includes compacted samples and an associated compacted sampling time indication. Compactor module may also contain inputs, memory and outputs. The inputs include a Sampling Clock; signal samples from source nodes via the mesh network; and a Sample present/absent indicator. The memory includes signal sample values and sample times and Counters for consecutive good samples and missed (void) samples, and the outputs include Compacted Sample Record of signal samples; corresponding realized sample times (intervals); a Total age of compacted sample record and a Length of largest sampling void. The compacting algorithm as described in connection with FIG. 5 also quantifies the validity of the transform process and thus the validity of the recovered signal. The Approximate Fourier transform process may be validated by including: a maximum allowed void length, a maximum allowed total age of the compacted record, and a minimum count of known good samples in the compacted record.

Domain Transform module 224 includes instructions to transform the paired vector representing the sampled signal in a time domain into a discrete Fourier spectrum of the signal in the frequency domain by applying an Approximate Fourier Transform such that the discrete Fourier spectrum of the signal is uniformly sampled in the frequency domain, meaning that the known points in the Fourier spectrum are at equally spaced frequencies.

Frequency filter module 226 includes instructions to filter in the frequency domain the discrete Fourier spectrum of the signal to generate a filtered discrete spectral representation. Filter operation may be selected on the basis of requirements for usage of recovered signal; such as lowpass linear phase in closed loop control applications, or bandpass if signal variance is to be estimated.

Inverse transform module 228 contains instructions to transform the filtered discrete spectral representation into a recovered signal in the time domain that is uniformly sampled.

In one implementation, the destination controller includes a second transmitter to provide an adjustment signal that may be transmitted to the source controller 102 via the mesh network 106 to adjust one or more of the characteristics of the electricity supplied from the power source based on the recovered signal. Further details of the adjustment decision application and process are described in FIGS. 3 and 4.

Figure 3:
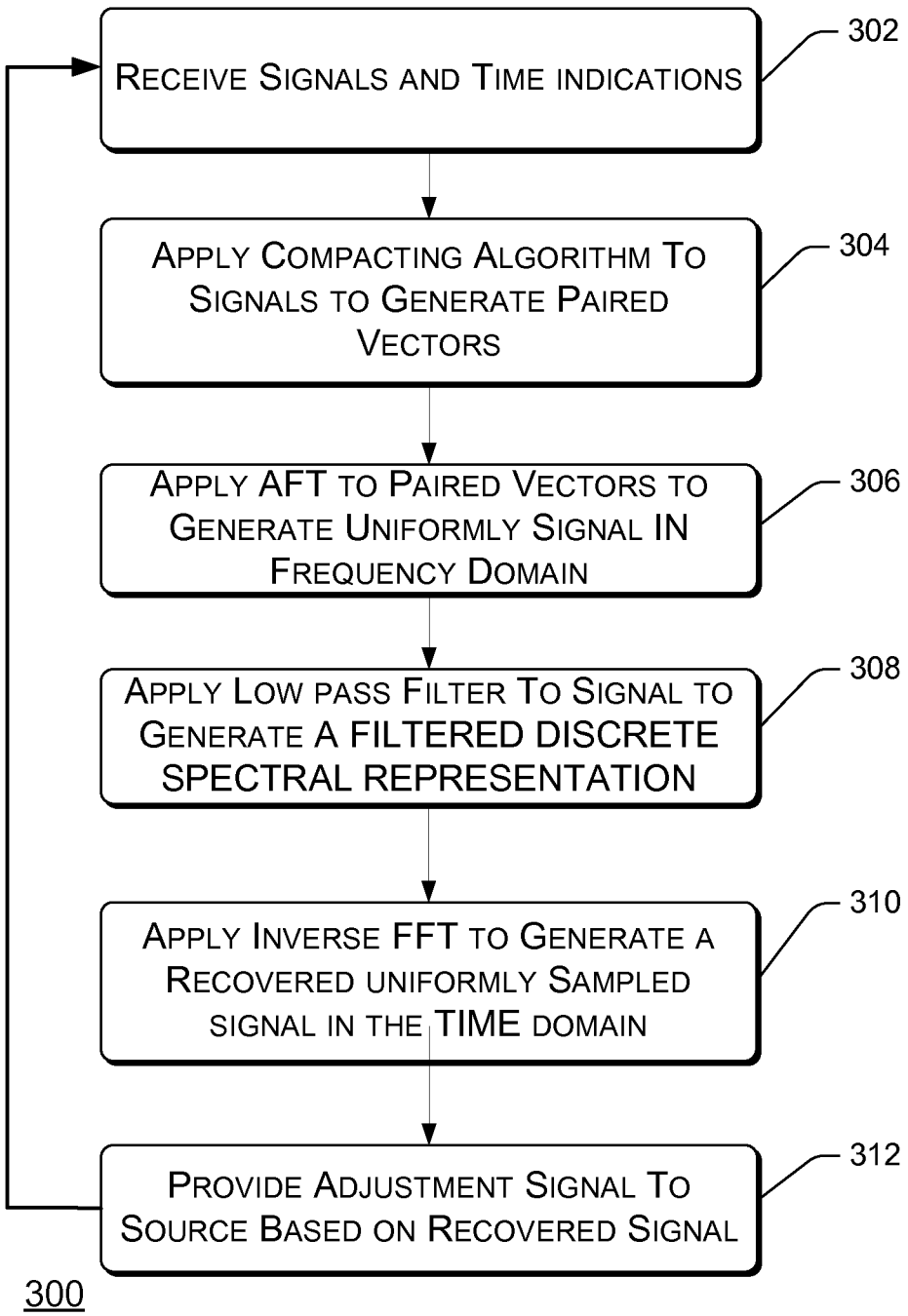
FIG. 3 is a flow chart illustrating a process executed by a destination controller used to handle information delivered via the wireless mesh network shown in FIG. 1.
Figure 4:
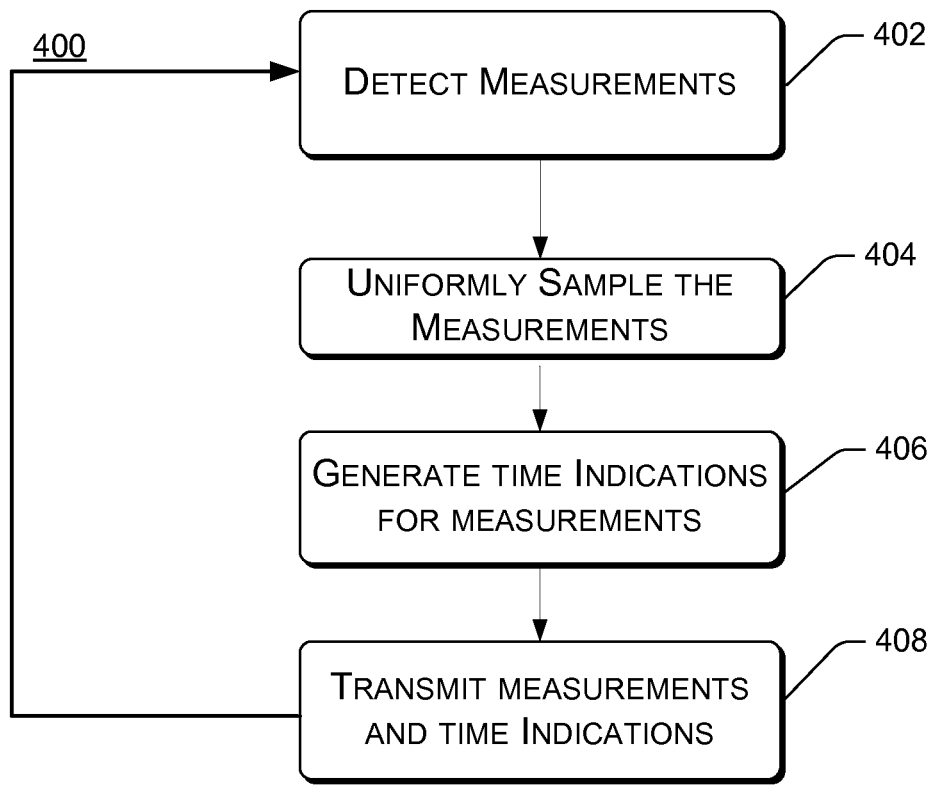
FIG. 4 is a flow chart illustrating a process executed by a source controller used to generate information for delivery via the wireless mesh network to the destination controller.

Illustrated in FIG. 3, is a process 300 executed by an exemplary destination controller 110 to recover a uniformly sampled signal from a signal received from the source controller 102. Illustrated in FIG. 4, is a process 400 executed by an exemplary source controller 102 to sampled and transmit measurements to the destination controller 110. The exemplary processes in FIG. 3 and FIG. 4 are illustrated as a collection of blocks in a logical flow diagram, which represents a sequence of operations that can be implemented in hardware, software, and a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes are described with reference to FIGS. 3 and 4, although it may be implemented in other system architectures.

Referring to FIG. 3, a process 300 is shown to generate with the destination controller 110 a recovered uniformly sampled signal in the frequency domain from a received signal.

In block 302, the destination controller 110 receives from the destination node one or more signal samples and associated sampling time indications from a source node via a mesh network. The one or more signal samples include sampling time indications and are formed into a series of one or more sampled signals corresponding to a characteristic of electricity supplied to one or more electrical devices from a power source.

In block 304, the destination controller 110 applies a compacting algorithm to the received signal samples and the received associated sampling time indications to generate a paired vector comprising samples and an associated compacted time indication. In one implementation, applying the compacting algorithm to the received samples and the received or derived associated sampling time indications to generate a paired vector comprising samples and an associated compacted sampling time indication that includes determining void indications in the received signal samples, and indicating a sampling time for each of the determined void indications.

In block 306, a paired vector representing the compacted sampled signal in a time domain is transformed into a discrete Fourier spectrum of the compacted sampled signal in the frequency domain where the discrete Fourier spectrum of the compacted sampled signal is uniformly sampled in the frequency domain. In one implementation an approximate Fourier transform (AFT) is applied to the paired vector to transform the paired vector into the discrete Fourier spectrum of the signal in the frequency domain. The AFT may be applied using techniques described in the following exemplary references:

(1) Eng, Frida, and Gustafsson, Frederik, "Algorithms for Downsampling Non-uniformly Sampled Data", 15$^{th}$ European Signal Processing Conference Proceedings, 2007.

(2) Eng, F., Gunnarsson, F., and Gustafsson, F., "Frequency Domain Analysis of Signals with Stochastic Sampling Times", IEEE Trans SP Vol. 56, No. 7, pp 3089-3099.

In block 308, a filter is applied in the frequency domain to the discrete Fourier spectrum of the signal to generate a filtered discrete spectral representation. In one implementation, a low pass filter in the frequency domain is applied to the discrete Fourier spectrum of the compacted sampled signal. The spectral attenuation and phase characteristics of the low pass filter may be set to be related to the rate at which the one or more of the characteristics of the electricity supplied from the power source can be adjusted.

In block 310, an inverse discrete Fourier transform is applied to the filtered discrete spectral representation to generate a recovered signal in the time domain that is uniformly sampled. In one implementation, an inverse Discrete Fourier transform (IDFT) is applied to the filtered discrete spectral representation to generate the recovered signal in the time domain that is uniformly sampled. In another implementation, an inverse discrete Fourier transform (IDFT) is applied to the filtered discrete spectral representation by setting an inversion time to a time greater than a total age of a compacted signal used to create the discrete spectral representation of the subject signal, and wherein the adjustment signal is provided based on the extrapolated future values to compensate for a group delay of the low-pass or band-pass filter.

In block 312, an indication is transmitted to the source controller 102 via the mesh network to adjust one or more of the characteristics of the electricity supplied from the power source based recovered signal. Exemplary characteristics related to electricity supplied to the electrical devices from a power source may include voltage, current, real power, reactive power, apparent power, power flow direction, temperature or humidity.

Referring to FIG. 4, a process 400 is shown that may be executed by source controller 102 to detect and sample measurements for transmission to destination controller 110.

In block 402, source controller 102 detects characteristics or measurements (measurements may be manifested as sampled signals) related to electricity supplied to one or more electrical devices from a power source. In block 404, source controller 102 uniformly samples the measurements and in block 406 generates time indications for the measurements. In block 408, source controller 102 transmits the measurements and time indications to destination controller 110 via mesh network. Source controller 102 repeats block 302 by detecting new measurements.

Figures 5A, 5B:
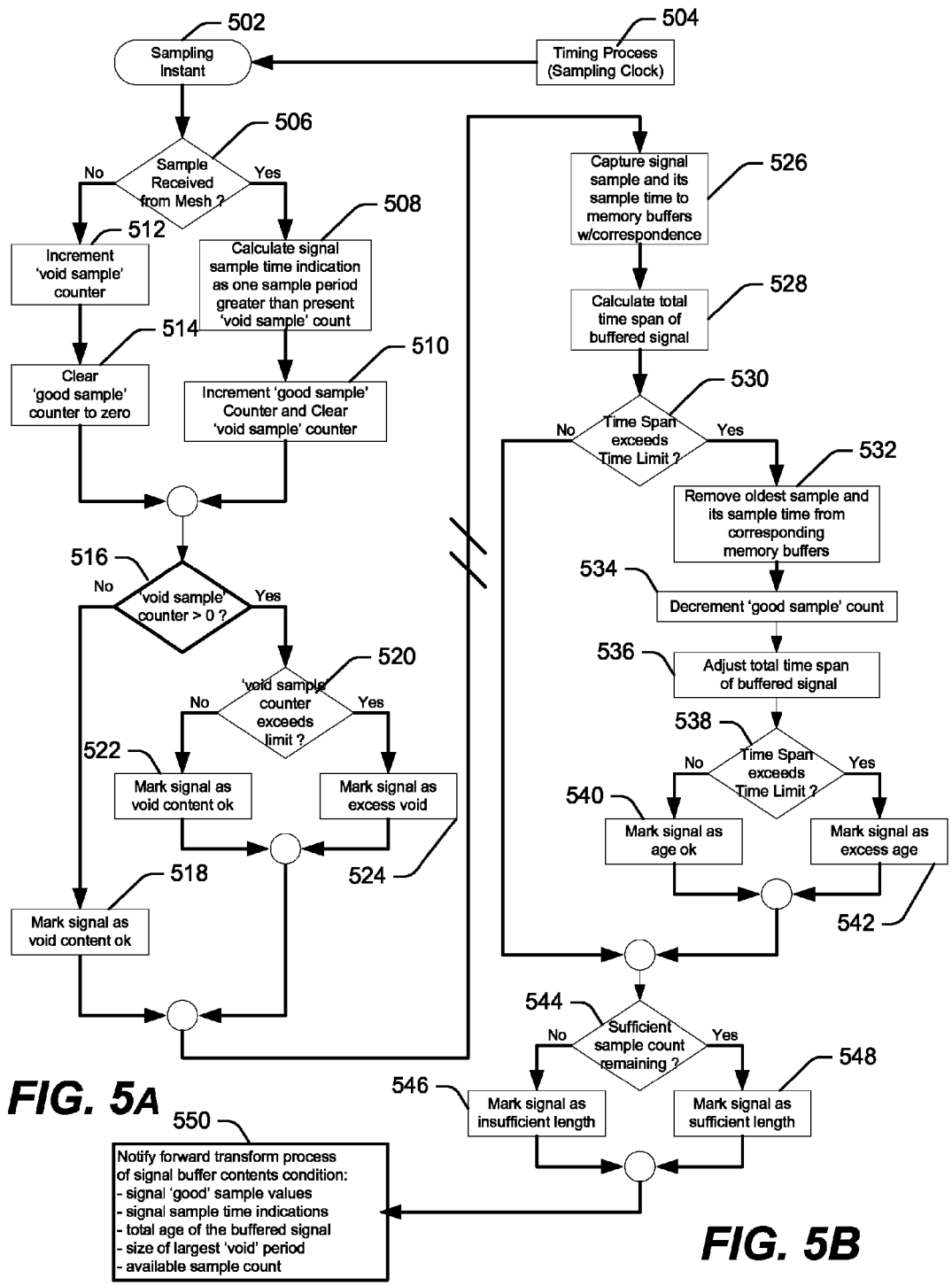
FIGS. 5a-5b are a flow chart illustrating a compacting process executed in the compacting module of the computing device of FIG. 2.

Referring to FIGS. 5a-5b, a process 500 is shown that may be executed by compactor 222 in computing device 200 (FIG. 2) to execute a compacting algorithm to generate a paired vector that includes compacted signal samples and an associated compacted sampling time indication.

In block 502, the compactor 222 upon being awakened by a timing process 504, fetches a sample from the mesh communication system.

In block 506, a determination is made whether the sample is received from the mesh communication system. If a sample is received then in block 508, a signal sample time indication is calculated as one sample time period greater than present "void sample count". Then in block 510, a good sample counter is incremented and the void sample counter is cleared and set to zero. If no sample is received from the mesh communication system in block 506, the "void sample counter" is incremented and the "good sample counter" is cleared and set to zero.

In block 516, a determination is made whether the "void sample counter" is not zero. If the void sample counter is zero then in block 518, a quality marker for the sampled signal related to the void is to indicate acceptable. If the void sample counter is not zero, then the void counter is further tested to determine if the counter exceed a predetermined acceptable limit in block 520. If the void sample counter does not exceed the limit, the then in block 522, a quality marker for the sampled signal related to the void is to indicate acceptable. If the void sample counter does exceed the limit, then in block 524, a quality marker for the sampled signal related to the void is to indicate unacceptable void.

Referring to FIG. 5B, after executed block 518, 522 and 524, in block 526 a signal sample and its sample time are stored in memory buffers with their correspondence to each other. In block 528, a total time span of the buffered signal is calculated. The total time span corresponds to the sum of the sample time in the sample time buffer.

In block 530, a determination is made whether the total time span exceed a predetermined acceptable age limit. The predetermined acceptable age limit may be estimated by consecutively capturing a number of signals related to the electrical power source characteristics and computing their Fourier spectra, and estimate the interval over which the Fourier spectra components of the captured signals are nominally constant (the nominally constant characteristic may be typically defined by the user of the system).

If the time span exceeds the time limit, in block 532 the oldest sample and its corresponding sample time are removed from the memory buffers. In block 534, the good sample count is decremented and in block 530, the total time span of the buffered signal is adjusted to reflect a reduced age of the sample.

In block 538, a determination is made as to whether the time span exceeds the predetermined time lime (in 530). If the time span does not exceed the time limit then in block 540, a quality marker for the sampled signal related to the age is asserted to indicate acceptable. If the time span does exceed the time limit then in block 542, a quality marker for the sampled signal related to the age is asserted to indicate excess age.

If the time span in block 530 exceeds the time limit or if the mark signal is marked in block 540 or 542, a determination is made in block 544 whether the is a sufficient sample count remaining. If there is sufficient sample count remaining, in block 546, and if the time span does not exceed the time limit then in block 546, a quality marker for the sampled signal related to the sample count is asserted to indicate insufficient length. If the time span does exceed the time limit then in block 544, a quality marker for the sampled signal related to the sample count is asserted to indicate sufficient length in block 548.

In block 550 domain transformer 124 is notified of: signal buffer contents condition, signal 'good' sample values, signal sample time indications, total age of the buffered signal, a size of largest 'void' period, and an available sample count.

The scope of the present invention is not limited by what has been specifically shown and described hereinabove. Those skilled in the art will recognize that there are suitable alternatives to the depicted examples of materials, configurations, constructions and dimensions. Numerous references, including patents and various publications, are cited and discussed in the description of this invention. The citation and discussion of such references is provided merely to clarify the description of the present invention and is not an admission that any reference is prior art to the invention described herein. All references cited and discussed in this specification are incorporated herein by reference in their entirety.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rackmounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

A computer employed to implement at least a portion of the functionality described herein may comprise a memory, one or more processing units (also referred to herein simply as "processors"), one or more communication interfaces, one or more display units, and one or more user input devices. The memory may comprise any computer-readable media, and may store computer instructions (also referred to herein as "processor-executable instructions") for implementing the various functionalities described herein. The processing unit(s) may be used to execute the instructions. The communication interface(s) may be coupled to a wired or wireless network, bus, or other communication means and may therefore allow the computer to transmit communications to and/or receive communications from other devices. The display unit(s) may be provided, for example, to allow a user to view various information in connection with execution of the instructions. The user input device(s) may be provided, for example, to allow the user to make manual adjustments, make selections, enter data or various other information, and/or interact in any of a variety of manners with the processor during execution of the instructions.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The indefinite articles "a" and "an," as used herein in the specification and in the claims, unless clearly indicated to the contrary, should be understood to mean "at least one."

The phrase "or," as used herein in the specification and in the claims, should be understood to mean "either or both" of the elements so conjoined, i.e., elements that are conjunctively present in some cases and disjunctively present in other cases. Multiple elements listed with "or" should be construed in the same fashion, i.e., "one or more" of the elements so conjoined. Other elements may optionally be present other than the elements specifically identified by the "or" clause, whether related or unrelated to those elements specifically identified. Thus, as a non-limiting example, a reference to "A or B", when used in conjunction with open-ended language such as "including" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "or" as defined above. For example, when separating items in a list, "or" or "or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

In the claims, as well as in the specification above, all transitional phrases such as "including," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

All definitions, as defined and used herein, should be understood to control over dictionary definitions, definitions in documents incorporated by reference, and/or ordinary meanings of the defined terms.

Variations, modifications and other implementations of what is described herein will occur to those of ordinary skill in the art without departing from the spirit and scope of the invention. While certain embodiments of the present invention have been shown and described, it will be obvious to those skilled in the art that changes and modifications may be made without departing from the spirit and scope of the invention. The matter set forth in the foregoing description and accompanying drawings is offered by way of illustration only and not as a limitation.

What is claimed is:

1. A method of controlling via a mesh network electricity supplied to electrical devices comprising:
   receiving, by a controller via a mesh network comprising a first emitter in communication with a second emitter forming a path to deliver signals, signal samples corresponding to a characteristic related to electricity supplied to one or more electrical devices from a power source;
   identifying, by the controller, sample time indications and void indications associated with the signal samples;
   generating a compacted signal in a time domain based on the sample time indications and the void indications, the compacted signal having compacted signal samples and corresponding sample times;
   transforming the compacted signal in the time domain to a signal uniformly sampled in a frequency domain;
   applying an inverse transform to a filtered version of the signal uniformly sampled in the frequency domain to recover a uniformly sampled signal in the time domain; and
   providing, by the controller, a signal based on the recovered uniformly sampled signal in the time domain that adjusts one or more characteristics of the electricity supplied to the one or more electrical devices from the power source.

2. The method of claim 1, further comprising:
   receiving the signal samples via a plurality of nodes of the mesh network.

3. The method of claim 1, wherein the characteristic related to electricity comprises at least one of voltage, current real power, power flow direction, reactive power, temperature, or humidity.

4. The method of claim 1, further comprising:
   deriving, by the controller, the sample time indications using a sample clock.

5. The method of claim 1, further comprising:
   applying, by the controller, a compacting algorithm to the signal samples and the sample time indications to generate a paired vector having the compacted signal samples and the corresponding sample times; and
   transforming the paired vector representing the compacted signal in the time domain into a discrete Fourier spectrum of the signal uniformly sampled in the frequency domain.

6. The method of claim 1, further comprising:
   applying at least one of a bandpass filter or a low pass filter to the signal uniformly sampled in the frequency domain to provide the filtered version of the signal uniformly sampled in the frequency domain.

7. The method of claim 1, further comprising:
   using an Approximate Fourier Transform to transform the compacted signal in the time domain to the signal uniformly sampled in the frequency domain, the signal uniformly sampled in the frequency domain comprising a spectral representation of the compacted signal in the time domain that is uniformly sampled in the frequency domain.

8. The method of claim 1, further comprising:
   determining a quality of the signal samples based on a void length and an age to generate the compacted signal.

9. The method of claim 1, further comprising:
   non-uniformly receiving the signal samples at the controller via the mesh network.

10. The method of claim 1, further comprising:
    determining a future value of the recovered uniformly sampled signal in the time domain; and
    providing the signal to adjust the electricity based on the future value.

11. A system to control via a mesh network electricity supplied to electrical devices, comprising:
    a receiver of a controller configured to receive, via a mesh network comprising a first emitter in communication with a second emitter forming a path to deliver signals, signal samples corresponding to a characteristic related to electricity supplied to one or more electrical devices from a power source;
    a compactor of the controller configured to identify sample time indications and void indications associated with the signal samples, and generate a compacted signal in a time domain based on the sample time indications and the void indications, the compacted signal having compacted signal samples and corresponding sample times;
    a transformer of the controller configured to transform the compacted signal in the time domain to a signal uniformly sampled in a frequency domain;
    an inverse transformer of the controller configured to apply an inverse transform to a filtered version of the signal uniformly sampled in the frequency domain to recover a uniformly sampled signal in the time domain; and
    a transmitter of the controller configured to provide a signal based on the recovered uniformly sampled signal in the time domain that adjusts one or more characteristics of the electricity supplied to the one or more electrical devices from the power source.

12. The system of claim 11, wherein the controller is further configured to:
    receive the signal samples via a plurality of nodes of the mesh network.

13. The system of claim 11, wherein the characteristic related to electricity comprises at least one of:
voltage, current real power, power flow direction, reactive power, temperature, or humidity.

14. The system of claim 11, wherein the controller is further configured to:
derive the sample time indications using a sample clock.

15. The system of claim 11, wherein the controller is further configured to:
apply a compacting algorithm to the signal samples and the sample time indications to generate a paired vector having the compacted signal samples and the corresponding sample times; and
transform the paired vector representing the compacted sampled signal in the time domain into a discrete Fourier spectrum of the signal uniformly sampled in the frequency domain.

16. The system of claim 11, wherein the controller is further configured to:
apply at least one of a bandpass filter or a low pass filter to the signal uniformly sampled in the frequency domain to provide the filtered version of the signal uniformly sampled in the frequency domain.

17. The system of claim 11, wherein the controller is further configured to:
use an Approximate Fourier Transform to transform the compacted signal in the time domain to the signal uniformly sampled in the frequency domain.

18. The system of claim 11, wherein the controller is further configured to:
determine a quality of the signal samples based on a void length and an age to generate the compacted signal in the time domain.

19. The system of claim 11, wherein the controller is further configured to:
non-uniformly receive the signal samples at the controller via the mesh network.

20. The system of claim 11, wherein the controller is further configured to:
determine a future value of the recovered uniformly sampled signal in the time domain; and
provide the signal to adjust the electricity based on the future value.

* * * * *